(12) United States Patent
Islam et al.

(10) Patent No.: US 6,697,521 B2
(45) Date of Patent: Feb. 24, 2004

(54) METHOD AND SYSTEM FOR ACHIEVING CODING GAINS IN WAVELET-BASED IMAGE CODECS

(75) Inventors: Asad Islam, Irving, TX (US); Fehmi Chebil, Tampere (FI)

(73) Assignee: Nokia Mobile Phones Ltd., Espoo (FI)

(*) Notice: Subject to any disclaimer, the term of this patent is extended or adjusted under 35 U.S.C. 154(b) by 195 days.

(21) Appl. No.: 09/883,105

(22) Filed: Jun. 15, 2001

(65) Prior Publication Data

US 2003/0002734 A1 Jan. 2, 2003

(51) Int. Cl.$^7$ ................................................. G06K 9/36
(52) U.S. Cl. ........................ 382/166; 382/240; 358/539
(58) Field of Search ............................... 382/166, 233, 382/232, 162, 167, 240, 244–248; 358/539, 426.1, 426.2, 426.13, 426.14, 426.16; 375/240.11, 240.18, 240.21, 240.23, 240.25; 348/472

(56) References Cited

U.S. PATENT DOCUMENTS

| | | | |
|---|---|---|---|
| 5,214,502 A | | 5/1993 | Stone et al. ................ 348/472 |
| 5,748,786 A | * | 5/1998 | Zandi et al. ................ 382/240 |
| 5,880,856 A | * | 3/1999 | Ferriere .................. 358/426.11 |
| 6,044,172 A | * | 3/2000 | Allen ......................... 382/166 |
| 6,067,383 A | | 5/2000 | Taniguchi et al. .......... 382/240 |
| 6,259,819 B1 | * | 7/2001 | Andrew et al. ............. 382/248 |

FOREIGN PATENT DOCUMENTS

EP 1022912 7/2000 ............ H04N/9/04

OTHER PUBLICATIONS

"Vector implementation of color–image wavelet transform"; Crandall et al., Apple Computer, Inc., Oct. 25, 1999, pp. 1–10.

* cited by examiner

*Primary Examiner*—Leo Boudreau
*Assistant Examiner*—Ishrat Sherali
(74) *Attorney, Agent, or Firm*—Ware, Fressola, Van Der Sluys & Adolphson

(57) ABSTRACT

A method and system for coding a RGB image in an encoder and a decoder. In the encoder, the RGB image components are converted into YUV components. One or more of the lower bit-planes of YUV components are eliminated before the YUV components are transformed by forward wavelet transform and coded into a codestream for transmission. In the decoder, the codestream is decoded and transformed by inverse wavelet transform into a set of reconstructed YUV components. The bit-planes of these reconstructed YUV components are up-shifted so that the up-shifted YUV components are structurally equivalent to the original YUV components before they are adjusted in the encoder. However, the lower bit-planes that come into being due to the up-shifting are all set to zero. The up-shifted YUV components are then converted into the RGB component of the reconstructed image.

34 Claims, 5 Drawing Sheets

METHOD AND SYSTEM FOR ACHIEVING CODING GAINS IN WAVELET-BASED IMAGE CODECS

FIELD OF THE INVENTION

The present invention relates generally to wavelet-based image codecs and, more particularly, to the improvement in image coding efficiency at high or nearly-lossless bit rates.

BACKGROUND OF THE INVENTION

It is generally known in the field of image processing that reducing the number of bits representing color components in an RGB image, for example, results in a smaller image file but a degraded image. With the introduction of scalable image coding formats like the JPEG2000, it has become possible to send and receive only a fraction of the image file and still reconstruct a high-quality image at the receiving end. The part that is dropped from the image usually contains information that describes the high-frequency components present in the image. That is, details that the human visual system (HVS) is not very sensitive to. However, dropping out all the details results in a blurry image. Thus, both reducing the color information in the original image and leaving out the details in the coded image result in an image of lower quality.

JPEG stands for Joint Photographic Experts Group. In 1988 this committee adopted its first standard, known as the JPEG baseline, which is based on discrete cosine transform (DCT) and on Huffman coding. In 1996, a call for proposals to advance a standardized image-coding system for the new millennium was issued and many algorithms were proposed. Presently, a new standard, named JPEG2000 has been finalized. This new standard provides low bit-rate operation, with rate-distortion and subjective image quality performance superior to existing standards, without sacrificing performance at other points in the rate-distortion spectrum. And more importantly, JPEG 2000 allows extraction of different resolutions, pixel fidelities, region of interest, multiple components, and more, all from a single compressed bitstream. This allows an application to manipulate, store or transmit only the essential information for any target device from any JPEG 2000 compressed source image.

JPEG2000 uses wavelets as the basis for its coding scheme. With wavelet-based coding, most of the image information is coded in the earlier stages of compression, giving good reconstruction at low rates. However, at high rates, a lot more data is used to refine the image to its original form and significant amounts of system resources, such as bandwidth and computational power, are used for coding an image. System resources can be very costly in certain environments, such as the mobile wireless terminal where both bandwidth and computational power are at a premium. Furthermore, the rate of improvement in image quality at high rates is insignificant when a large amount of data is needed for the purpose. Moreover, the HVS is not able to appreciably discern the difference in image quality at high rates. For example, it can be hard to differentiate between two images at 40 dB and 50 dB, when, in fact, they can be quite different in their respective coded file sizes. If the HVS does not have the ability to detect very subtle changes in an image, then it is inefficient and perhaps unnecessary to spend any coding resources on data that corresponds to such changes.

In prior art, coding efficiency is improved by an operation called "thinning". As disclosed in EP 1 022 912 A2 (Sugimori), the quantity of data after the irreversible color transform is reduced by removing some of the image pixels. This operation results in degradation of the spatial resolution of the image.

There is a need for pre-processing the image data such that only the significant parts of the image data are retained for coding while the insignificant parts are removed. This is based on the fact that the HVS does not have the ability to detect very subtle changes in an image.

It is advantageous and desirable to provide a method of image coding where the degradation of the spatial resolution of the image can be avoided while reducing the quantity of the data to be compressed and coded.

SUMMARY OF THE INVENTION

It is a primary objective of the present invention to provide a method and system for coding an image using a wavelet-based image coding scheme to achieve gains at high or nearly lossless rates. At high and nearly lossless rates, most wavelet based image coding schemes code data that does not contribute significantly to the visual improvement of image quality. Thus, the objective of the present invention can be achieved by eliminating the data that does not affect the image quality as perceived by a human observer. In particular, the elimination of insignificant data from an image is carried out before wavelet transformation and compression, thereby increasing the coding efficiency and reducing computation complexity.

The present invention improves prior art solutions by considerably reducing the amount of data present in an image for encoding and transmission while maintaining the visual quality of the image. The advantage can be appreciated particularly in nearly-lossless applications where the compressed file size is substantially reduced without sacrificing the visual image quality.

To achieve the aforementioned objective, the present invention reduces the color information in all pixels in an unequal manner, after the irreversible color transformation. More specifically, the present invention removes insignificant data from the image source by eliminating one or more lower bit planes of an image in the YUV color space.

Accordingly, the first aspect of the present invention is a method of encoding an image, wherein the image is separated into a plurality of first color components of a first color space, and the first color components are converted into a plurality of second color components of a second color space different from the first color space, each of the second color components having a number of more-significant bit-planes and a first number of less-significant bit-planes. The encoding method comprises the steps of:

adjusting the second color components into adjusted second color components by changing the first number of less-significant bit-planes of at least one of the second color components to a second number smaller than the first number;

transforming the adjusted second color components based on a forward wavelet transformation for providing transformed image data; and coding the transformed image data for forming a bitstream indicative of the transformed image data.

According to the present invention, the first color space is an RGB color space and the second color space is a YUV color space.

Preferably, the second color components include one luminance component and two chrominance components and the first number is 2, and wherein the second number of bit-planes in the luminance component is 0 and the second number of bit planes in the chrominance components is 1. Furthermore, the number of the more-significant bit-planes is 6. Thus, among the second color components, the total number of bit-planes of the luminance component is 6 and the total number of bit-planes of either one of the chrominance components is 7.

However, it is possible that the first number of 1 and the second number of any of the components is 0.

Preferably, the number of more-significant bit-planes is 6. However, it is possible that the number of more-significant bit-planes is more or less than 6, or equal to 0.

Preferably, the reducing step is achieved by bit-shifting. However, it is possible that the reducing step is achieved through a look-up table.

According to the second aspect of the present invention, an apparatus for encoding an image separated into a plurality of first color components of a first color space, wherein the first color components are converted into a plurality of second color components of a second color space different from the first color space, each of the second color components having a number of more-significant bit-planes and a first number of less-significant bit-planes, said apparatus comprising:

means, responsive to the second color components, for adjusting from at least one of the second color components the first number of bit-planes to a second number smaller than the first number for providing adjusted second color components;

means for transforming the adjusted color components into transformed image data based on a forward wavelet transformation for providing a signal indicative of the transformed image data, and means, responsive to the signal, for coding the transformed image data and forming a bitstream indicative of the coded transformed image data.

Preferably, the adjusting means comprises a bit-shifter or a bit-shifting software program for effecting the bit-plane reduction. Alternatively, the adjusting comprises a look-up table for effecting the bit-plane reduction.

According to the present invention, the second number of each of the second color components is predetermined and stored in the encoder for the adjusting means to provide the adjusted second color components based on the stored second number. Alternatively, the second number is conveyed to the encoder.

According to the third aspect of the present invention, a software program for use in an encoder having transform means and coding means for processing image data indicative of an image into a bitstream, wherein the image is separated into a plurality of first color components of a first color space, and the first color components are converted into a plurality of second color components of a second color space different from the first color space, each of the second color components having a number of more-significant bit-planes and a first number of less-significant bit-planes, said software program comprising the steps of:

adjusting, from at least one of the second color components, the first number of bit-planes to a second number smaller than the first number for providing adjusted second color components;

providing the adjusted second color components to the transform means so as to allow the transform means to transform the adjusted second color components based on a forward wavelet transformation into transformed image data, and the coding means to form the bitstream based on the transformed image data.

Preferably, the adjusting step is based on bit-shifting. Alternatively, the adjusting step is based on a look-up table.

According to the fourth aspect of the present invention, an apparatus for decoding a bitstream having coded data indicative of an image into a reconstructed image, wherein the image is separated into a plurality of first color components of a first color space;

the first color components are converted into a plurality of second color components of a second color space different from the first color space, each of the second color components having a first number of more-significant bit-planes and a second number of less-significant bit-planes;

the second color components are adjusted into adjusted color components by changing, from at least one of the second color components, the second number of bit-planes to a corresponding third number smaller than the second number for providing adjusted second color components in the second color space;

the adjusted color components are transformed into transformed image data based on a forward wavelet transformation; and the transformed data is coded into the bitstream having the coded data, said apparatus comprising:

means, responsive to the bitstream, for decoding the coded data for providing reconstructed transformed data;

means for processing the reconstructed transformed data based on an inverse wavelet transformation for providing first reconstructed color components in the second color space;

means for changing the first reconstructed color components into second reconstructed color components in the second color space, such that each of the second reconstructed color components has a number of more-significant bit-planes equal to the first number, and a number of less-significant bit-planes equal to the second number.

According to present invention, the apparatus may comprises means for converting the second reconstructed color components in the second color space into third reconstructed color components in the first color space for forming the reconstructed image, wherein each of the third reconstructed color components has a number of more-significant bit-planes equal to the first number, and a number of less-significant bit-planes equal to the second number.

According to the present invention, the corresponding third number of said at least one of the second color components is predetermined, said apparatus further comprising means for obtaining said corresponding third number so as to allow the changing means to change the first reconstructed color components into the second reconstructed color components based on the obtained third number. Alternatively, the corresponding third number of said at least one of the second color components is included in the bitstream so as to allow the changing means to change the first reconstructed color components into the second reconstructed color components based on the included third number.

According to the present invention, each of the first reconstructed color components is corresponding to one of the second color components, and each of the first reconstructed color components has a number of more-significant bit-planes equal to the first number, and a number of less-significant bit-planes equal to the third number of less-significant bit-planes of the corresponding one of the second color components.

According to the fifth aspect of the present invention, a software program for use in an apparatus for processing a bitstream having coded data indicative of an image into a reconstructed image, wherein the image is separated into a plurality of first color components of a first color space;

the first color components are converted into a plurality of second color components of a second color space different from the first color space, each of the second color components having a first number of more-significant bit-planes and a second number of less-significant bit-planes;

the second color components are adjusted into adjusted second color components by changing, from at least one of the second color components, the second number of bit-planes to a corresponding third number smaller than the second number for providing adjusted second color components in the second color space;

the adjusted color components are transformed into transformed image data based on a forward wavelet transformation; and the transformed data is coded into the bitstream having the coded data, said apparatus comprising:

means, responsive to the bitstream, for decoding the coded data for providing reconstructed transformed data;

means for processing the reconstructed transformed data based on an inverse wavelet transformation for providing first reconstructed color components in the second color space, each of the first reconstructed color components corresponding to one of the second color components, wherein each of the first reconstructed color components has a number of more-significant bit-planes equal to the first number, and a fourth number of less-significant number of bit-planes equal to the corresponding third number; said software program comprising the steps of:

changing the first reconstructed color components into second reconstructed color components in the second color space, effectively adding a number of bit-planes to at least one of the first reconstructed color components corresponding to said at least one of the second color components such that each of the second reconstructed color components has a number of more-significant bit-planes equal to the first number, and a number of less-significant bit-planes equal to the second number; and setting pixel values of the added bit-planes to zero.

Preferably, the changing step is based on bit-shifting. Alternatively, the changing step is achieved through a look-up table.

According to the sixth aspect of the present invention, a system for coding an image into a bitstream and decoding the bitstream into a reconstructed image, wherein the image is separated into a plurality of first color components of a first color space, and the first color components are converted into a plurality of second color components of a second space different from the first color space, wherein each of the second color components has a first number of more-significant bit-planes and a second number of less-significant bit planes, said system comprising:

means, responsive to the second color components, for adjusting at least one of the second color components the second number of bit-planes to a corresponding third number smaller than the second number for providing adjusted second color components in the second color space;

means for transforming the adjusted second color components into transformed image data based on a forward wavelet transformation for providing a signal indicative of the transformed image data;

means, responsive to the signal, for coding the transformed image data and forming a bitstream having coded information indicated of the coded transformed image data;

means, responsive to the bitstream, for decoding the coded information for providing reconstructed transformed data;

means for processing the reconstructed transformed data based on an inverse wavelet transformation for providing first reconstructed color components in the second color space; and means for changing the first reconstructed color components into second reconstructed color components in the second color space indicative of the reconstructed image, such that each of the second reconstructed color components has a number of more-significant bit-planes equal to the first number, and a number of less-significant bit-planes equal to the second number.

Optionally, the system comprises means for converting the second reconstructed color components in the second space into third reconstructed color components in the first color space for forming the reconstructed image.

The present invention will become apparent upon reading the description taken in conjunction with FIGS. 1 to 3b.

DETAILED DESCRIPTION OF THE INVENTION

Figure 1:
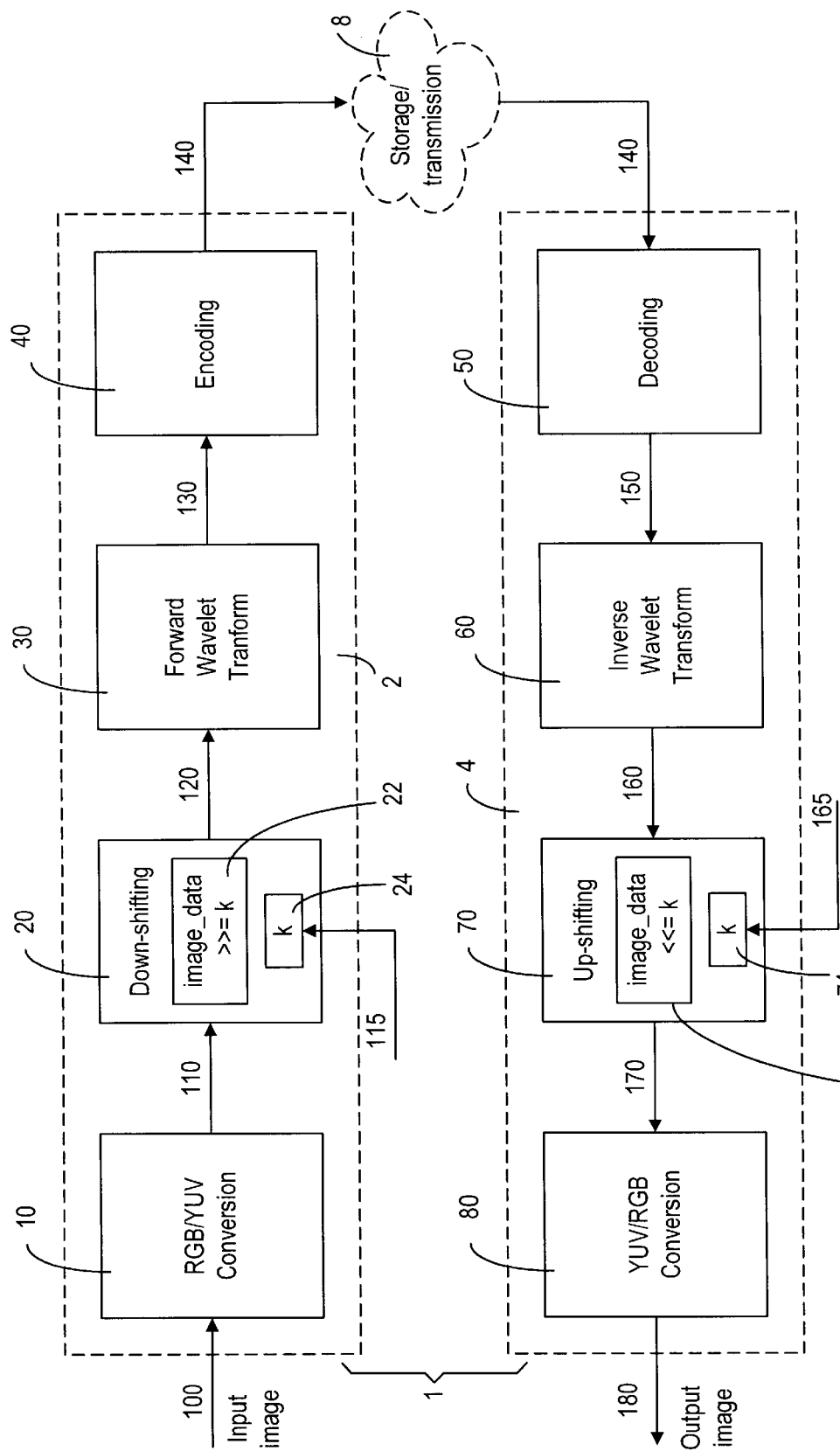
FIG. 1 is a block diagram illustrating a system for coding an image, which includes an encoder and decoder, according to the present invention.

The least-significant bits (LSB's) of an image usually do not significantly affect the visual quality of images. By eliminating one or two of the LSB's, substantial coding gains can be achieved. According the JPEG2000 coding operations, the most-significant bits (MSB's) are coded first. By the time the LSB's are coded, most of the image information has already been sent. Thus, very little information is added by the LSB's to refine the image. On the other hand, the cost of adding this information to the compressed bit-stream is high. It is desirable and advantageous to reduce or eliminate this added information regarding the LSB's if the reduction of image quality is not visually obvious.

It has been observed in many different color images that the chroma (U,V) components have most of their values concentrated around the zero value (or around 128 when the values are translated by 128 to make all non-negative and the in range of (0, 255)). The distribution is approximately Laplacian. In the bit range of (0, 255), the U,V components are mostly in the range of 16 and 160. However, it seems possible to use 7-bits for a complete representation of a typical chroma image. In a lumina image, it seems possible to use only 6-bits for a complete representation. An experiment has been conducted using a color image in the YUV format, wherein the lower bit planes of the color components are suppressed by the following simple code, applied to every pixel value in the image:

$$\text{image\_data} = (\text{image\_data} >> k) << k \quad (1)$$

where k=1 or 2 depending on the number of LSB's to be suppressed. In those suppressed LSB's, the bit values are set to zero. Without encoding and decoding, the suppressed image is shown on a display. It is observed that the visual quality is not appreciably affected when one LSB in the UV components is suppressed and one or two LSB's in the Y component are suppressed.

When the actual images that are JPEG2000 coded are similarly suppressed, the only code changes that are required at the encoder and the decoder are, respectively:

$$\text{image\_data} >>= k \quad (2)$$

and $$\text{image\_data} <<= k, \quad (3)$$

where k=1 or 2. The bit-shifting in the encoder, according to Eq.2, is carried out before the forward wavelet transform. The bit-shifting in the decoder, according to Eq.3, is carried out after the inverse wavelet transform. The lossless file sizes for different values of k are shown in Table I (lossless rate=8.00 bpp). The image quality of the images that are JPEG2000 coded and LSB suppressed is not appreciably affected when one or two LSB's in the Y component are suppressed while only one LSB in the U,V components is suppressed. From Table I, it can be seen that the reduction in the lossless file size is significant.

TABLE 1

Lossless file sizes for different values of suppressed LSB's

| Y LSB suppressed | U, V LSB suppressed | Filesize (in bytes) |
| --- | --- | --- |
| 0 | 0 | 16,789 |
| 1 | 0 | 13,978 |
| 1 | 1 | 12,976 |
| 2 | 0 | 11,861 |
| 2 | 1 | 10,700 |

Thus, the encoding process of the present invention includes a step of reducing the number of bit-planes in the YUV components prior to decorrelation. In the decoding process of the present invention, a step of increasing the number of the bit-planes in the reconstructed YUV components is used to restore the color bit-depth of the YUV image prior to converting the YUV image to an RGB image. The image coding system 1, including an encoder 2 and a decoder 4, for coding an image, according to the coding method of the present invention, is shown in FIG. 1.

As shown in FIG. 1, the input image 100 is a digital image that can be separated into three color (R, G, B) planes. The RGB image 100 is conveyed to an RGB/YUV converter 10 for color conversion. In particular, the RGB/YUV converter 10 is used to perform forward component transformation of the irreversible color transform (ICT) type on the RGB image 100 into a YUV image 110 in the YUV color space. The ICT is achieved by:

$$Y_0(x,y)=0.299I_0(x,y)+0.587I_1(x,y)+0.114I_2(x,y)$$
$$Y_1(x,y)=-0.1687I_0(x,y)-0.3321I_1(x,y)+0.5I_2(X,y) \quad (4)$$
$$Y_2(x,y)=0.5I_0(x,y)-0.41869I_1(x,y)+0.0.081I_2(x,y)$$

where $I_0$, $I_1$, $I_2$ are the input image components or red, green and blue, respectively, and $Y_0$, $Y_1$, $Y_2$ are the luminance, or Y component and chrominance or U, Y components.

At this stage, each of the Y, U and V components of the YUV image 110 has the same number of bit-planes (typically 8). A bit-plane down-shifting module 20 is used to remove one or more lower bit-planes of each component. The bit-plane down-shifting module 20 uses a software program or bit-shifter 22 to successively downshift every bit-plane in the Y, U and V components of the YUV image 110 by $k_1$ bit(s), $k_2$ bit(s) and $k_3$ bit(s), respectively, according to Equation 2. It should be noted that in this image data truncation process, the lower $k_1$, $k_2$ and $k_3$ LSB's of the Y, U and V components are not set to zero. They are completely eliminated from the remaining encoding process. Thus, all the higher MSB's are shifted down an appropriate number of bits. Accordingly, if k=1, a component having a color depth of 8 bit-planes become a reduced component of 7 bit-planes with the least-significant bit-plane removed. Similarly, if k=2, an 8-bit color component becomes a 6-bit color component, with two of the less-significant bit-planes removed.

Preferably, $k_1$ is equal to 2 while $k_2$ and $k_3$ are equal to 1. This means that, after image data truncation, the number of bit-planes for Y component is 6, the number of bit-planes for the U and V components is 7. Alternatively, all $k_1$, $k_2$ and $k_3$ can be equal to 1. Since one or more entire bit-planes are completely eliminated by the bit-plane down-shifting module 20, this results in a substantial reduction in the image data to encode. This is especially true in the case of the lowest one or two bit-planes, which contain information corresponding to most or all pixels in the image, in contrast to higher bit planes, which contain information corresponding to a relatively small number of high energy pixels in the image.

In the encoder 2, according to the present invention, the data elimination step is carried out before the image data undergoes the forward wavelet transformation. After this data elimination, the encoder 2 processes and encodes the image in the same way as it would a regular image. As shown, the image data containing the reduced components, which is denoted by reference numeral 120, is conveyed to a forward wavelet transformation module 30. The reduced image data 120 may be subjected to tiling before or after forward wavelet transform. Tiling and forward wavelet transform are known in the art. In the tiling process, the image components are divided into tiles, or rectangular arrays of points on a reference grid registered with and offset from the reference grid origin and defined by a width and a height. The tiling of an image creates tile-components that can be extracted or decoded independently of each other, because the tile components relate to the same portion of each of the components that make up the image. The tile-components are decomposed into different decomposition levels using the forward wavelet transform. These decomposition levels contain a number of subbands, which consist of coefficients that describe the horizontal and vertical spatial frequency characteristics of the original tile component. The decomposition type allowed is of a dyadic form, and the coefficients provide frequency information about a local area of an image. As such, a small number of coefficients can completely describe a single sample. Moreover, the individual subbands of a tile-component are divided into blocks as the compressed data is processed into a codestream.

The coefficients resulting from the forward wavelet transformation process are herein referred to as the transformed image data and denoted by reference numeral 130. The transformed image data 130 is then encoded and compressed in an encoding module 40 and formed into a codestream 140. The encoding module 40 typically includes a forward quantization module, a coding module and codestream former. The forward quantization process, the coding process and the codestream forming are known in the art. As shown, the codestream 140 can be stored in a storage means 8 for future use, or transmitted to the decoder 4 for reconstructing the image.

In the image reconstruction process, the decoding module 50 reads the codestream 140 and performs inverse quantization on the read image data into reconstructed transformed data 150. After inverse wavelet transformation, the reconstructed transformed data 150 is converted to image data in the YUV color space, or a reconstructed YUV image 160. The decoding process and the inverse wavelet transform are known in the art. The reconstructed image 160 is a reconstruction of the image 120, which is the result of the bit-plane down-shifting operation (Eq.2) carried out the down-shifting module 20. In order to complete the decoding process, the reconstructed image 160 must be bit-shifted back to the original color depth. As shown, a bit-shifter or software program 72 in the bit-plane upshifting module 70 is used in this bit-shifting process. Using the algorithm as shown in Eq.3, the higher MSB's of the Y, U and V components in the reconstructed image 160 are successively up-shifted by $k_1$, $k_2$ and $k_3$ bits, respectively, to the original place in the bit-plane structure. The $k_1$, $k_2$ and $k_3$ lower LSB's of the Y, U, V components that come into being to zero. For example, if the numbers of the bit-planes of the Y, U and V components of the image 120 are 6, 7 and 7, respectively, reduced from 8, then the numbers of the bit-planes of the Y, U and V component of the image 160 are also 6, 7 and 7. In that case, the bit-plane up-shifting module 70 effectively adds two lowest LSB's to the Y component, and one LSB each to the U and V components. After this bit-shifting operation, the number of the bit-planes in the Y, U, V components in the restored YUV image 170 is 8. The restored YUV image 170 is conveyed to a YUV/RGB converter 80 for inverse component transform. The inversion component transform is shown in Eq.5.

$$I_0(x,y)=Y_0(x,y)+1.402Y_2(x,y)$$
$$I_1(x,6)=Y_0(x,y)-0.34413Y_1(x,y)-0.71414\ Y_2(x,y) \quad (5)$$
$$I_2(x,y)=Y_0(x,y)+1.772Y_1(x,y)$$

The result is an RGB image 180. It should be noted that, because the information in the LSB's that is eliminated by the bit-plane down-shifting module 20 cannot be recovered in the decoding process, exact construction of image is not possible. However, the visual degradation is usually negligible and may not even be detectable in most cases, while the savings in bandwidth and computational power are substantial.

In an image coding system wherein the $k_1$, $k_2$ and $k_3$ values for truncating/restoring the YUV components are predetermined, the corresponding values can be pre-set and stored in a storage 22 in the down-shifting module 20, and in a storage 72 in the up-shifting module 70 for carrying out the downshifting and upshifting operations. However, if the k value is a variable, which is allowed to change according to applications, then the corresponding value k can be sent by the encoder 2 to the decoder 4 as part of the codestream 140, so that the decoder can decode the image correctly. Alternatively, the $k_1$, $k_2$ and $k_3$ are conveyed to the encoder 2 as indicated by arrow 115, and to the decoder 4 as indicated by arrow 165.

Figure 2A:
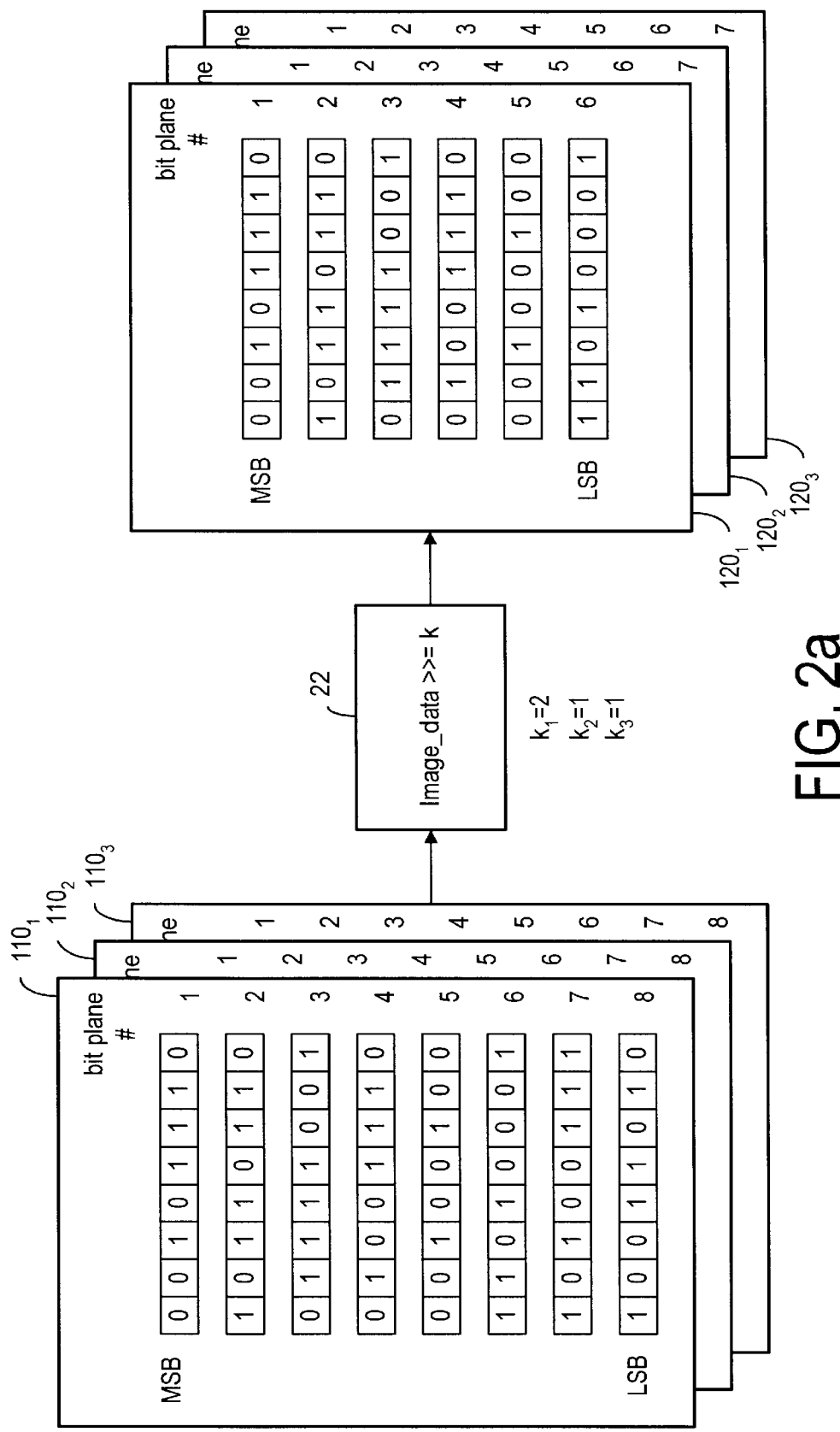
FIG. 2a is a diagrammatic representation illustrating a bit-shifter or a bit-shifting software for down-shifting bit-planes, according to the present invention.

FIG. 2a illustrates the down-shifting of the three color components $110_1$, $110_2$, and $110_3$ of a YUV image 110 (FIG. 1), according to Eq.2. Originally, each color component has 8 bit-planes with the most-significant bit-plane (MSB) being bit-plane No. 1 and the least-significant bit-plane (LSB) being bit-plane No. 8. With $k_1=2$, $k_2=1$, and $k_3=1$, the color components $110_1$, $110_2$, and $110_3$ are changed by the bit-shifter or software program 22 into a set of reduced color components $120_1$, $120_2$, and $120_3$ of a YUV image 120 (FIG. 1). Each of the reduced color components $120_1$, $120_2$, and $120_3$ has 6, 7 and 7 bit-planes, respectively. The least-significant bit-planes of the reduced color components are bit-planes No. 6, 7 and 7, respectively. If each of the color components $110_1$, $110_2$, and $110_3$ is expressed as having 6 more-significant bit-planes and 2 less-significant bit-planes, then the number of the more-significant bit-planes is not changed in the bit-shifting operation. The more-significant bit-planes are just downshifted by 2 bits, 1 bit and 1 bit, respectively. Of the less-significant bit-planes, two are eliminated from color component $110_1$, and one each from $110_2$, $110_3$ by the bit-shifting operation of Eq.2.

Figure 2B:
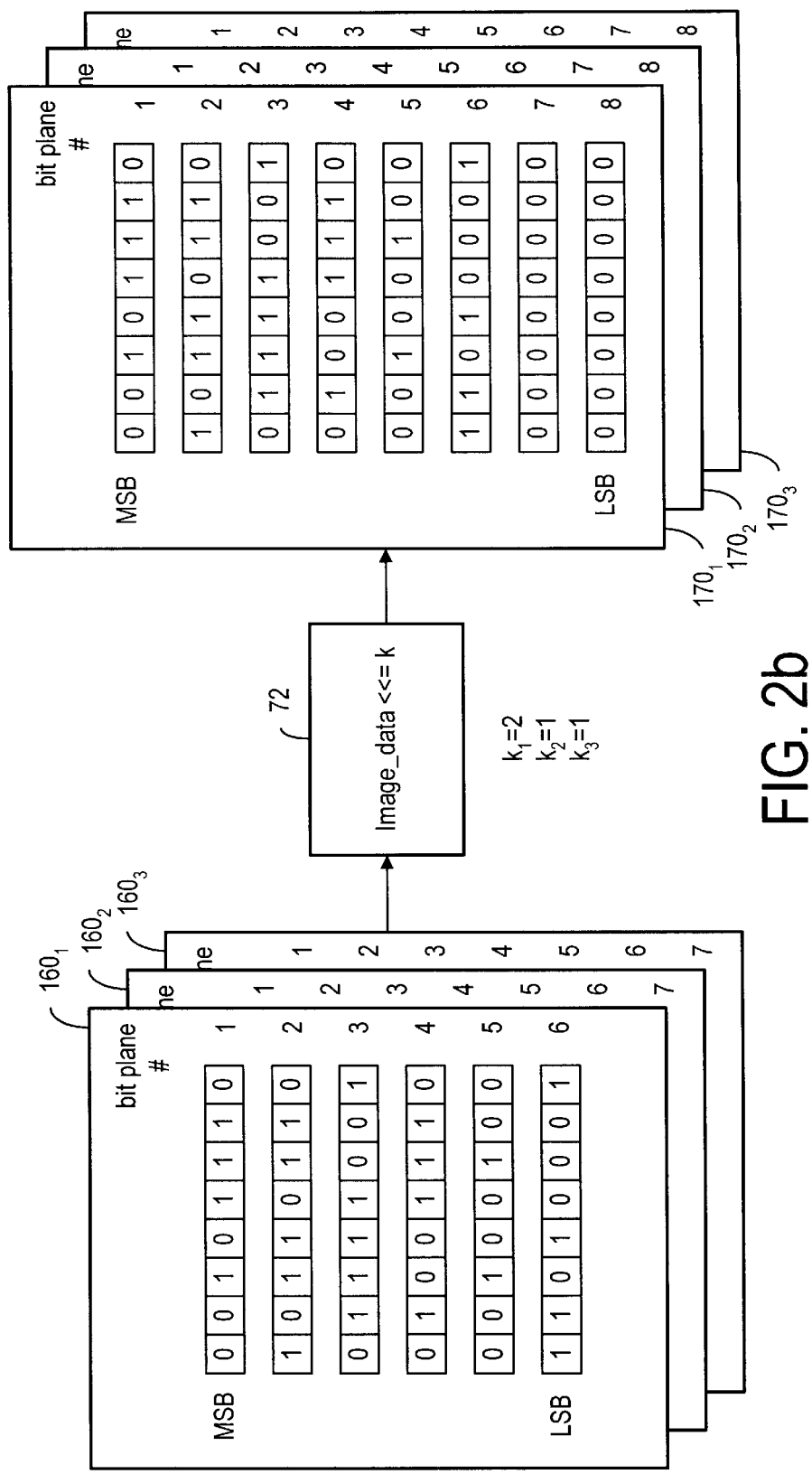
FIG. 2b is a diagrammatic representation illustrating a bit-shifter or a bit-shifting software for up-shifting bit-planes, according to the present invention.

FIG. 2b illustrates the up-shifting of the three color components $160_1$, $160_2$, and $160_3$ of a YUV image 160 (FIG. 1), according to Eq.3. With $k_1=2$, $k_2=1$, and $k_3=1$, the color components $160_1$, $160_2$, and $160_3$ are changed by a bit-shifter or software program 72 to a set of color components $170_1$, $170_2$, and $170_3$ of a YUV image 170 (FIG. 1). Each of the color components $160_1$, $160_2$, and $160_3$ has 6, 7 and 7 bit-planes, respectively, before bit-shifting. After bit-shifting, each of the color components $170_1$, $170_2$, and $170_3$ has 8-bits. However, the pixel values in the last two less-significant bit-planes (No. 7 and No. 8) in the color component 170, and the least-significant bit-plane (No. 8) of the color components $170_2$, and $170_3$ are set to zero. Again, if each of the color components $170_1$, $170_2$, and $170_3$ is expressed as having 6 more-significant bit-planes and 2 less-significant bit-planes, then the more-significant bit-planes are identical to those of the color components $110_1$, $110_2$, and $110_3$. However, one or two of the less-significant bit-planes in the color components $110_1$, $110_2$, and $110_3$ are lost in the coding and encoding processes.

Figure 3A:
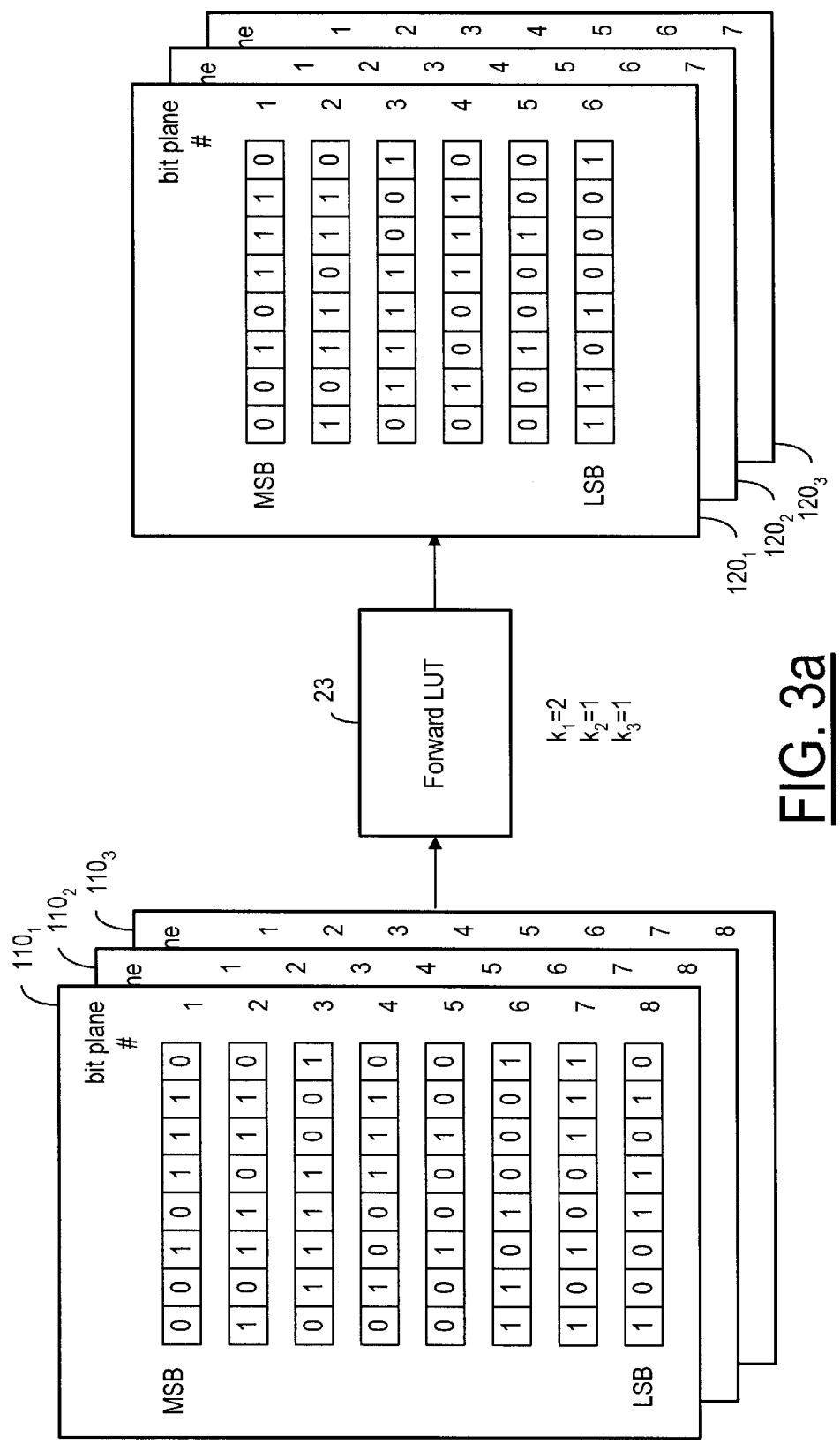
FIG. 3a is a diagrammatic representation illustrating a look-up table for effecting bit-plane down-shifting, according to the present invention.
Figure 3B:
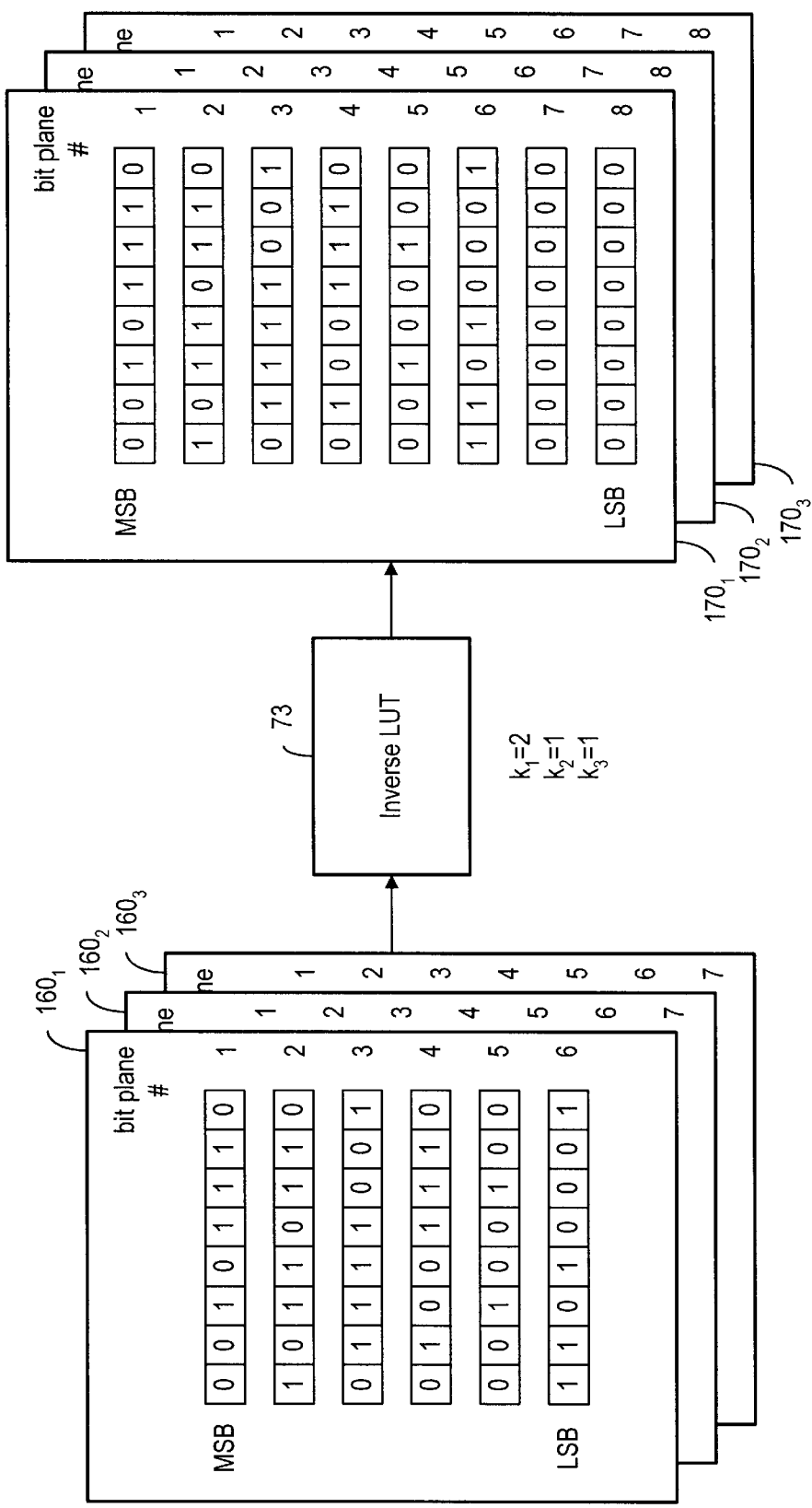
FIG. 3b is a diagrammatic representation illustrating a look-up table for effecting bit-plane up-shifting, according to the present invention.

FIG. 3a illustrates a look-up table 23, instead of the bit-shifter or software program 22, being used to effect down-shifting. FIG. 3b illustrates a look-up table 73, instead of the bit-shifter or software program 72, being used to effect up-shifting.

As mentioned above, the preferred $k_1$, $k_2$ and $k_3$ values for bit-shifting according to Eq.2 and Eq.3 are 2, 1 and 1. Alternatively, $k_1$, $k_2$ and $k_3$ can all be 1. However, these k values can be greater or smaller depending on the availability of the bandwidth and computational power, and the required image quality.

Thus, although the invention has been described with respect to a preferred embodiment thereof, it will be understood by those skilled in the art that the foregoing and various other changes, omissions and deviations in the form and detail thereof may be made without departing from the spirit and scope of this invention.

What is claimed is:

1. A method of encoding an image separated into a plurality of first color components of a first color space, wherein the first color components are converted into a plurality of second color components of a second color space different from the first color space, each of the second color components having a number of more-significant bit-planes and a first number of less-significant bit-planes, said encoding method comprising the steps of:

adjusting the second color components by changing the first number of less-significant bit-planes of at least one of the second color components to a second number smaller than the first number;

transforming the adjusted second color components based on a forward wavelet transformation for providing transformed image data; and coding the transformed image data for forming a bitstream indicative of the transformed image data.

2. The encoding method of claim 1, wherein the first number is 1 and the second number is 0.

3. The encoding method of claim 1, wherein the first and second numbers are predetermined.

4. The encoding method of claim 1, wherein the second color components include one luminance component and two chrominance components and the first number is 2, and wherein the second number of bit-planes in the luminance component is 0 and the second number of bit planes in the chrominance components is 1.

5. The encoding method of claim 4, wherein the number of the more-significant bit-planes is 6.

6. The encoding method of claim 4, wherein the number of the more-significant bit-planes is 0.

7. The encoding method of claim 1, wherein the adjusted second color components include one luminance component having 6 or 7 bit-planes and two chrominance components each having 7 bit-planes.

8. The encoding method of claim 1, wherein the adjusting step is achieved by bit-shifting.

9. The encoding method of claim 1, wherein the adjusting step is achieved through a look-up table.

10. The encoding method of claim 1, wherein the first color space is an RGB space and the second color space is a YUV color space.

11. The encoding method of claim 1, wherein the second color space is based on a representation comprising a luminance component and at least one color difference component.

12. An apparatus for encoding an image separated into a plurality of first color components of a first color space, wherein the first color components are converted into a plurality of second color components of a second color space different from the first color space, each of the second color components having a number of more-significant bit-planes and a first number of less-significant bit-planes, said apparatus comprising:

means, responsive to the second color components, for adjusting from at least one of the second color components the first number of bit-planes to a second number smaller than the first number for providing adjusted second color components;

means for transforming the adjusted color components into transformed image data based on a forward wavelet transformation for providing a signal indicative of the transformed image data, and means, responsive to the signal, for coding the transformed image data and forming a bitstream indicative of the coded transformed image data.

13. The apparatus of claim 12, wherein the adjusting means comprises a bit-shifter for effecting the bit-plane reduction.

14. The apparatus of claim 12, wherein the adjusting means comprises a bit-shifting software program for effecting the bit-plane reduction.

15. The apparatus of claim 12, wherein the adjusting means comprises a look-up table for effecting the bit-plane reduction.

16. The apparatus of claim 12, wherein the second number of each of the second color components is predetermined, said apparatus further comprising means for storing the pre-determined second numbers and the adjusting means providing the second color components based on the stored second number.

17. The apparatus of claim 12, further comprising means for obtaining the second number of each of the second color components so as to allow the adjusting means to adjust the second color components to the adjusted second color components.

18. The apparatus of claim 12, wherein the first color space is an RGB color space and the second color space is a YUV color space.

19. A software program product embodied in a computer readable medium for use in an encoder having transform means and coding means for processing image data indicative of an image into a bitstream, wherein the image is separated into a plurality of first color components of a first color space, and the first color components are converted into a plurality of second color components of a second color space different from the first color space, each of the second color components having a plurality of more-significant bit-planes and a first number of less-significant bit-planes, said software program comprising the steps of:

adjusting, from at least one of the second color components, the first number of bit-planes to a second number smaller than the first number for providing adjusted second color components;

providing the adjusted second color components to the transform means so as to allow the transform means to transform the adjusted second color components based on a forward wavelet transformation into transformed image data, and the coding means to form the bitstream indicative of the transformed image data.

20. The software program of claim 19, wherein the adjusting step is based on bit-shifting.

21. The software program of claim 19, wherein the adjusting step is based on a look-up table.

22. An apparatus for processing a bitstream having coded data indicative of an image into a reconstructed image, wherein the image is separated into a plurality of first color components of a first color space;

the first color components are converted into a plurality of second color components of a second color space different from the first color space, each of the second color components having a first number of more-significant bit-planes and a second number of less-significant bit-planes;

the second color components are adjusted into adjusted second color components by changing, from at least one of the second color components, the second number of bit-planes to a corresponding third number smaller than the second number for providing adjusted second color components in the second color space;

the adjusted color components are transformed into transformed image data based on a forward wavelet transformation; and the transformed data is coded into the bitstream having the coded data, said apparatus comprising:

means, responsive to the bitstream, for decoding the coded data for providing reconstructed transformed data;

means for processing the reconstructed transformed data based on an inverse wavelet transformation for providing first reconstructed color components in the second color space;

means for changing the first reconstructed color components into second reconstructed color components in the second color space, such that each of the second reconstructed color components has a number of more-significant bit-planes equal to the first number, and a number of less-significant bit-planes equal to the second number.

23. The apparatus of claim 22, further comprising means for converting the second reconstructed color components in the second color space into third reconstructed color components in the first color space for forming the reconstructed image, wherein each of the third reconstructed color components has a number of more-significant bit-planes equal to the first number, and a number of less-significant bit-planes equal to the second number.

24. The apparatus of claim 22, wherein the first color space is an RGB color space and the second color space is a YUV space.

25. The apparatus of claim 22, wherein the corresponding third number of said at least one of the second color components is predetermined, said apparatus further comprising means for obtaining said corresponding third number so as to allow the changing means to change the first reconstructed color components into the second reconstructed color components based on the obtained third number.

26. The apparatus of claim 22, wherein the corresponding third number of said at least one of the second color components is included in the bitstream so as to allow the changing means to change the first reconstructed color components into the second reconstructed color components based on the included third number.

27. The apparatus of claim 22, wherein each of the first reconstructed color components is corresponding to one of the second color components, and each of the first reconstructed color components has a number of more-significant bit-planes equal to the first number, and a number of less-significant bit-planes equal to the third number of less-significant bit-planes of the corresponding one of the second color components.

28. A software program product embodied in a computer readable medium for use in an apparatus for processing a bitstream having coded data indicative of an image into a reconstructed image, wherein the image is separated into a plurality of first color components of a first color space;

the first color components are converted into a plurality of second color components of a second color space different from the first color space, each of the second color components having a first number of more-significant bit-planes and a second number of less-significant bit-planes;

the second color components are adjusted into adjusted second color components by changing, from at least one of the second color components, the second number of bit-planes to a corresponding third number smaller than the second number for providing adjusted second color components in the second color space;

the adjusted color components are transformed into transformed image data based on a forward wavelet transformation; and the transformed data is coded into the bitstream having the coded data, said apparatus comprising:

means, responsive to the bitstream, for decoding the coded data for providing reconstructed transformed data;

means for processing the reconstructed transformed data based on an inverse wavelet transformation for providing first reconstructed color components in the second color space, each of the first reconstructed color components corresponding to one of the second color components, wherein each of the first reconstructed color components has a number of more-significant bit-planes equal to the first number, and a fourth number of less-significant number of bit-planes equal to the corresponding third number;

said software program comprising the steps of:

changing the first reconstructed color components into second reconstructed color components in the second color space, effectively adding a number of bit-planes to at least one of the first reconstructed color components corresponding to said at least one of the second color components such that each of the second reconstructed color components has a number of more-significant bit-planes equal to the first number, and a number of less-significant bit-planes equal to the second number; and setting pixel values of the added bit-planes to zero.

29. The software program of claim 28, wherein the changing step is based on bit-shifting.

30. The software program of claim 28, wherein the changing step is achieved through a look-up table.

31. A system for coding an image into a bitstream and decoding the bitstream into a reconstructed image, wherein the image is separated into a plurality of first color components of a first color space, and the first color components are converted into a plurality of second color components of a second space different from the first color space, wherein each of the second color components has a first number of more-significant bit-planes and a second number of less-significant bit planes, said system comprising:

means, responsive to the second color components, for adjusting at least one of the second color components the second number of bit-planes to a corresponding third number smaller than the second number for providing adjusted second color components in the second color space;

means for transforming the adjusted second color components into transformed image data based on a forward wavelet transformation for providing a signal indicative of the transformed image data;

means, responsive to the signal, for coding the transformed image data and forming a bitstream having coded information indicated of the coded transformed image data;

means, responsive to the bitstream, for decoding the coded information for providing reconstructed transformed data;

means for processing the reconstructed transformed data based on an inverse wavelet transformation for providing first reconstructed color components in the second color space; and means for changing the first reconstructed color components into second reconstructed color components in the second color space indicative of the reconstructed image, such that each of the second reconstructed color components has a number of more-significant bit-planes equal to the first number, and a number of less-significant bit-planes equal to the second number.

32. The system of claim 31, further comprising means for converting the second reconstructed color components in the second space into third reconstructed color components in the first color space for forming the reconstructed image.

33. The system of claim 31, wherein each of the first reconstructed color components is corresponding to one of the second color components, and wherein each of the first reconstructed color components has a number of less-significant bit-planes equal to the third number of less-significant bit-planes of the corresponding one of the second color components.

34. The system of claim 31, wherein the first color space is an RGB color space, and the second color space is a YUV color space.

* * * * *